United States Patent [19]

Hunter

[11] Patent Number: 5,347,400
[45] Date of Patent: Sep. 13, 1994

[54] OPTICAL SYSTEM FOR VIRTUAL REALITY HELMET

[76] Inventor: Ken Hunter, 835 Laurel Ave., Belmont, Calif. 94002

[21] Appl. No.: 58,618

[22] Filed: May 6, 1993

[51] Int. Cl.$^5$ .............................................. G02B 7/02
[52] U.S. Cl. .................... 359/815; 359/813; 359/742; 359/630; 345/7; 345/8
[58] Field of Search ............... 359/813, 815, 742, 630, 359/631, 632; 340/700, 701, 702, 703, 705; 345/150–155, 7–9

[56] References Cited

U.S. PATENT DOCUMENTS

| | | | |
|---|---|---|---|
| 3,865,468 | 2/1975 | Holcomb | 359/815 |
| 4,968,123 | 11/1990 | Fournier, Jr. et al. | 359/630 |
| 5,001,786 | 3/1991 | Copeland | 359/630 |
| 5,091,719 | 2/1992 | Beamon, III | 340/705 |
| 5,184,231 | 2/1993 | Ellis | 359/815 |

Primary Examiner—Loha Ben
Assistant Examiner—Thomas Robbins
Attorney, Agent, or Firm—Townsend and Townsend Khourie and Crew

[57] ABSTRACT

The present invention provides an optical system for a virtual reality head mounted display with improved image quality, enlarged field of view, and enhanced adjustability. In one embodiment, the optical system comprises a housing coupled to the frame of the head mounted display, a pair of displays mounted to the housing each defining a visual plane, and first and second lenses mounted between each of the displays and the user's eyes. The lenses are mounted to the housing such that each lens is disposed at an angle of between 1° and 15° relative to the visual plane. The lenses are also mounted such that the interoptic distance between the lenses may be adjusted. The optical system also has a unique lens construction including a standard Fresnel lens mounted in parallel to a low-diffraction Fresnel lens, resulting in substantially reduced diffractive interference.

29 Claims, 7 Drawing Sheets

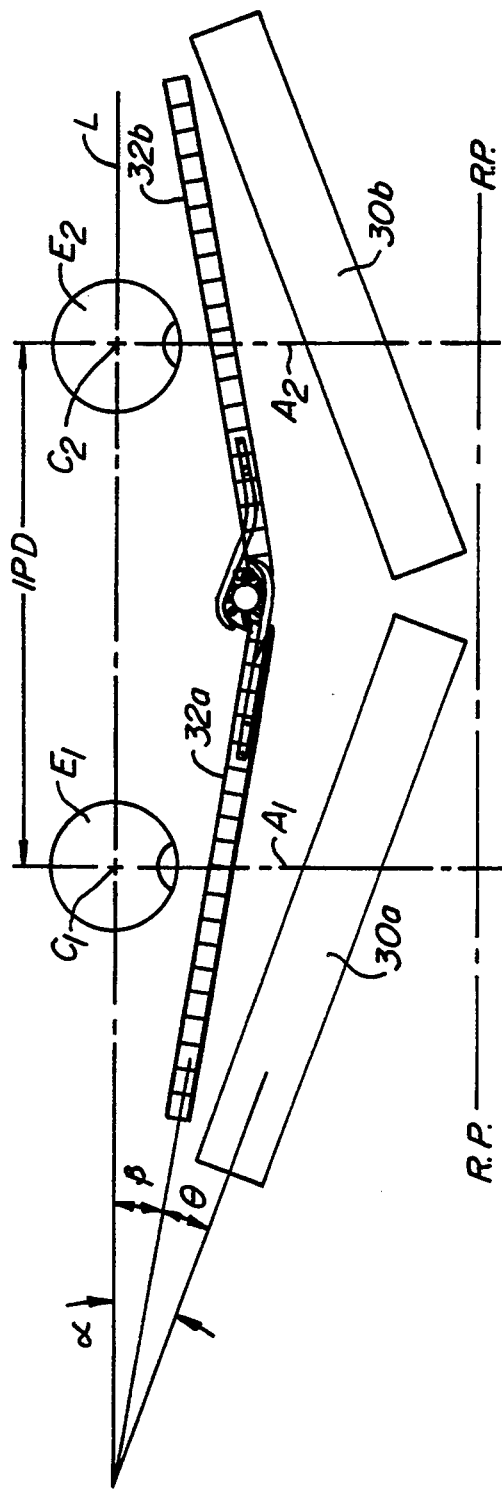
FIG. 4A.
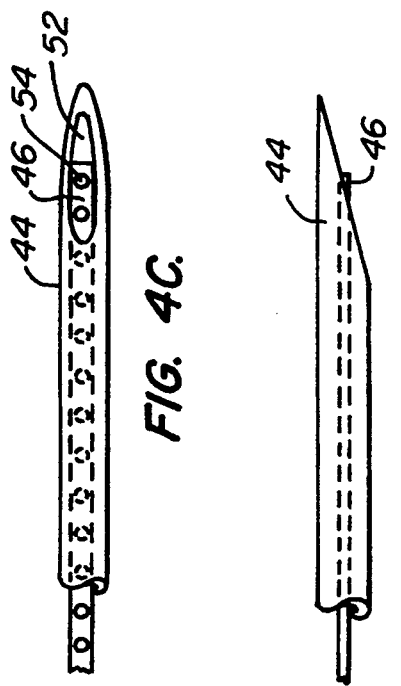
FIG. 4C.
FIG. 4D.
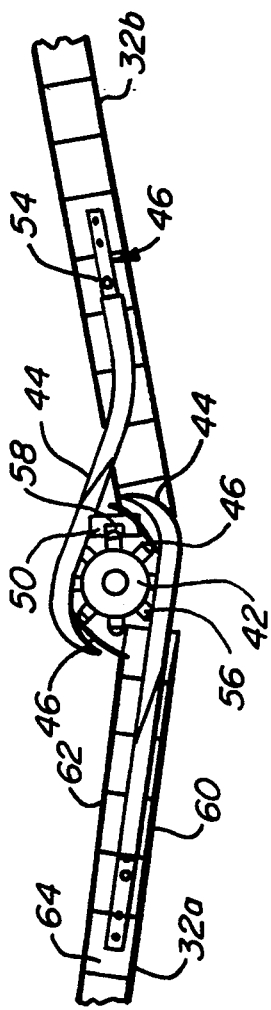
FIG. 4B.

OPTICAL SYSTEM FOR VIRTUAL REALITY HELMET

BACKGROUND OF THE INVENTION

The present invention relates generally to virtual reality technology, and more specifically to improved optical systems for virtual reality head mounted displays.

Virtual reality has become the focus of increased attention in recent years. Virtual reality systems are already in practical use in various fields, being utilized by, for example, engineers and architects for modelling and testing new designs, by doctors to practice an operation before it is conducted, and by military experts to simulate battlefield conditions. Such virtual reality systems employ sophisticated computers utilizing multisensory inputs and outputs to create an interactive virtual world in which a product, procedure or human response may be tested without the risks inherent in real-world trials.

In order to accurately simulate human interaction with a virtual environment, be it the inside of an internal combustion engine, an operating room or a battlefield, virtual reality systems aim to facilitate input and output of information representing human senses. In many situations, among all the human senses, sight is perhaps most useful as an evaluative tool. Accordingly, an optical system for visualization is an important part of most virtual reality systems.

Visualization in virtual reality systems is typically accomplished by means of a head-mounted display (HMD) mounted in a helmet or goggles worn on the user's head with an electronic display mounted in front of the user's eyes. A housing surrounds the display to reduce or eliminate ambient light. In some systems, stereoscopic vision is facilitated through the use of a pair of displays, each aligned with one of the user's eyes. More compact configurations are achieved by mounting the displays relatively close to the eyes, typically within 3 inches, and providing short focal length, wide-angle lenses between each eye and the associated display.

Larger displays may be used at relatively close range through the use of Fresnel lenses to provide wider field of view. Fresnel lenses have their curves reduced from a single large curved face to a series of equivalently curved rings or steps. If an ordinary, continuously curved lens is compared to a Fresnel lens, the angle of the surface of the lens face at any point relative to the XY plane through the lens would be the same in both lens types for an equivalent focal length lens; however, the Fresnel lens would appear flat with ridges forming rings.

In addition to the loss in weight produced by this loss in volume (while retaining the same focal length), the Fresnel can be cast in plastic rather than glass, further reducing the weight.

Since the Fresnel condenser pair is comprised of 2 flat (ridged) objects, instead of 2 objects with extreme curvature, they can be placed in closer proximity without contacting one another, thus reducing front projection.

Vision is further improved by the use of multiple lenses. A pair of lenses may be arranged in parallel in a configuration called a short focal length condenser pair. This arrangement is limited in how thin it can be made by the curvature of the lenses. Once the lenses touch each other, the total thickness cannot be reduced further, putting a lower limit on the space occupied by the lens pair.

In a head mounted display, the design goals include light weight and limited front projection (the distance from the face of the wearer to the outer extent of the housing). This front projection is large when using conventional lenses due to the thickness and curvature of the lenses, even though the focal length (the distance between the eye and the display) of the system, perceived to be 60 inches or so, is actually only about 1½ inches.

While virtual reality visualization systems have shown promise, known systems have suffered from certain drawbacks. Primary among these has been the poor quality of the image produced by the optics in known systems. Part of this problem stems from the limited field of view afforded by known optical systems. In such systems, the displays and lenses have generally been mounted in a plane perpendicular to the optical axis, limiting the degree of wide-angle visualization possible.

In addition, efforts to provide wider field of view through the use of two parallel Fresnel lenses have been compromised by the effects of Moiré interference, creating image-degrading diffraction patterns. Standard Fresnels have ridges as described above which define the lens curvature spaced at equal distances, in other words, steps of equal size (but different curvature angle $\theta$). When two identical Fresnels are stacked in a condenser pair, the wave fronts are slightly distorted by each lens. In this configuration the "steps" result in light passing through the thicker cross sections more slowly than through the thinner areas (because light moves slower in solid space than in air). These wave front distortions, which are identical because the lens ridges of each are identical, each add and a subtract from the relative power of the other, resulting in a pattern of strengthened and weakened power from point to point. This is known as Moiré interference, and is perceived as a series of light and dark tings, greatly accentuated if the lens axes are de centered from each other. This principle can be demonstrated by moving two pieces of window screen past each other.

Image quality in known systems is further degraded by the inability to adjust the interoptic distance between the left and right lenses to compensate for the different interpupillary distances of various users. Moreover, while some known virtual reality HMDs have allowed adjustment of the roll (vertical perpendicularity) of the lenses and displays relative to the user's eyes, such systems have suffered from the inability to adjust the height of the displays and lenses relative to the eyes, along with the roll.

For these reasons, an improved optical system for a virtual reality head mounted display is desired which will overcome the disadvantages of previous systems. In particular, the optical system should provide wider field of view for improved image quality at the outer edges of the displays, as well as permitting the use of larger displays. The optical system should have improved image quality by reducing the interference effects of parallel lenses. The optical system should further allow adjustment of the interoptic distance between the left and right lenses, as well as the height and roll of the displays and lenses relative to the eyes, to optimize image quality for each user.

SUMMARY OF THE INVENTION

The invention provides an optical system for a virtual reality HMD which produces improved image quality and enhanced adjustability over known systems. The optical system of the invention improves image quality by eliminating much of the Moiré interference caused by previous parallel Fresnel lens systems. Additionally, the optical system provides a substantially wider field of view, facilitating improved visualization of the outer portions of the displays, as well as permitting the use of larger displays. The optical system of the invention further allows optimization of image quality for each individual user by providing adjustability of the lenses and displays in various directions. In particular, the optical system provides means for adjusting the interoptic distance between the left and right lenses, as well as means for adjusting the roll and height of the displays and lenses relative to the user's eyes.

In a first embodiment, the invention provides an optical system for a virtual reality HMD of the type having a frame which is fixed relative to a person's head. The optical system includes a housing coupled to the frame of the virtual reality HMD, and a pair of displays attached the housing so as to be in alignment with the person's eyes. The displays each define a visual plane in which an image will be displayed. The optical system also includes a left lens system disposed between a first of the displays and the person's left eye, and a right lens system disposed between a second of the displays and the person's right eye. The optical system further comprises means for mounting the left and right lenses to the housing such that each lens is disposed at a first angle in a range of 1°–15° relative to the visual plane. In a preferred embodiment, the mounting means also includes means for adjusting the interoptic distance between the left and right lenses.

In a preferred aspect of the invention, the left and right lenses will be mounted out of the visual plane defined by each display, usually between 5° and 15° relative thereto, and preferably at about 10° relative thereto. In a further aspect of the invention, the visual planes defined by the displays will be disposed at an angle of between 1° and 30°, usually between 10° and 25°, and preferably at about 20°, relative to a line including centers of both of the person's eyes, with the outer or lateral edges of each display being closer to the line than the inner edges. This arrangement of the displays non-orthogonal to the optical axis, and the disposition of the lenses tilted outside of the visual plane defined by the displays, provides an extremely wide field of view while maintaining high visual quality across the image to the outside edges of the displays.

In an exemplary embodiment, the lens mounting means comprises a rotatable shaft mounted to the housing and a pair of linkages extending between the shaft and the left and right lenses, whereby rotating the shaft translates the linkages to change the interoptic distance between the lenses. In one embodiment, the linkages comprise flexible drive strips slidably disposed within guide tubes mounted to the housing, the drive strips having a plurality of holes, apertures or indentations along at least a portion of their length. The shaft has a pinion mounted to one end, with teeth on the pinion for engaging the holes in the drive strips. In one embodiment, the holes in the drive strip will be round, while the teeth on the pinion will be cylindrical with conical tips. Means for rotating the shaft, such as a thumb wheel, will be mounted to one end of the shaft to facilitate rotation by the user. In this way, the interoptic distance between the lenses may be easily adjusted to match the interpupillary distance of each user.

The optical system of the invention further provides means for adjusting roll of the lenses and displays about an axis parallel to a line including centers of both of the person's eyes. In a preferred embodiment, the means for adjusting roll further allows adjustment of the height of the lenses and displays relative to the person's eyes. In an exemplary embodiment, the means for adjusting roll comprises a hub fixed to the frame of the virtual reality HMD and means for rotatably coupling the housing to the hub. The means for rotatably coupling the housing to the hub may comprise, for example, a flexible spine disposed within the hub and having an axial passage, a cable extending through the axial passage having a first end connected to the housing and a second end connected to the hub, and means for exerting tension on the cable. The spine may include a plurality of interconnected segments which are pivotal with respect to one another about only one axis, each segment having an axial bore for receiving the cable. Preferably, the segments will also include interlocking means for maintaining the housing in a desired position, which may comprise, for example, a plurality of transverse steps along the mating surfaces of each segment. In this way, the steps of adjacent segments mesh with one another when drawn together by the tensioned cable. Means are also provided for releasing tension on the cable to permit adjustment.

The optical system of the invention further provides improved lenses which significantly reduce the image-degrading Moire interference produced by previous lenses. In a preferred embodiment, each of the left and fight lenses comprises an inner lens and an outer lens arranged in parallel and separated by a spacer. One of the inner and outer lenses has different optical properties than the other of the two. In an exemplary embodiment, the outer lens will be a standard Fresnel lens, while the inner lens will be a low-diffraction Fresnel lens. The surface cut pattern of the low-diffraction Fresnel lens is different than that of the standard Fresnel lens, resulting in a substantial reduction in Moire interference produced when light passes through the lens pair. Image quality is thus improved significantly.

A further understanding of the nature and advantages of the invention may be realized by reference to the remaining portions of the specification and the drawls.

BRIEF DESCRIPTION OF THE DRAWINGS

FIG. 4A is a top view of the optical system of FIG. 3.

FIG. 4B is a close-up top view of the interoptic distance adjustment mechanism in the optical system of FIG. 4A.

FIGS. 4C and 4D are front and top close-up views of the guide tubes and drive strips in the mechanism of FIG. 4B.

DESCRIPTION OF SPECIFIC EMBODIMENTS

Figure 1:
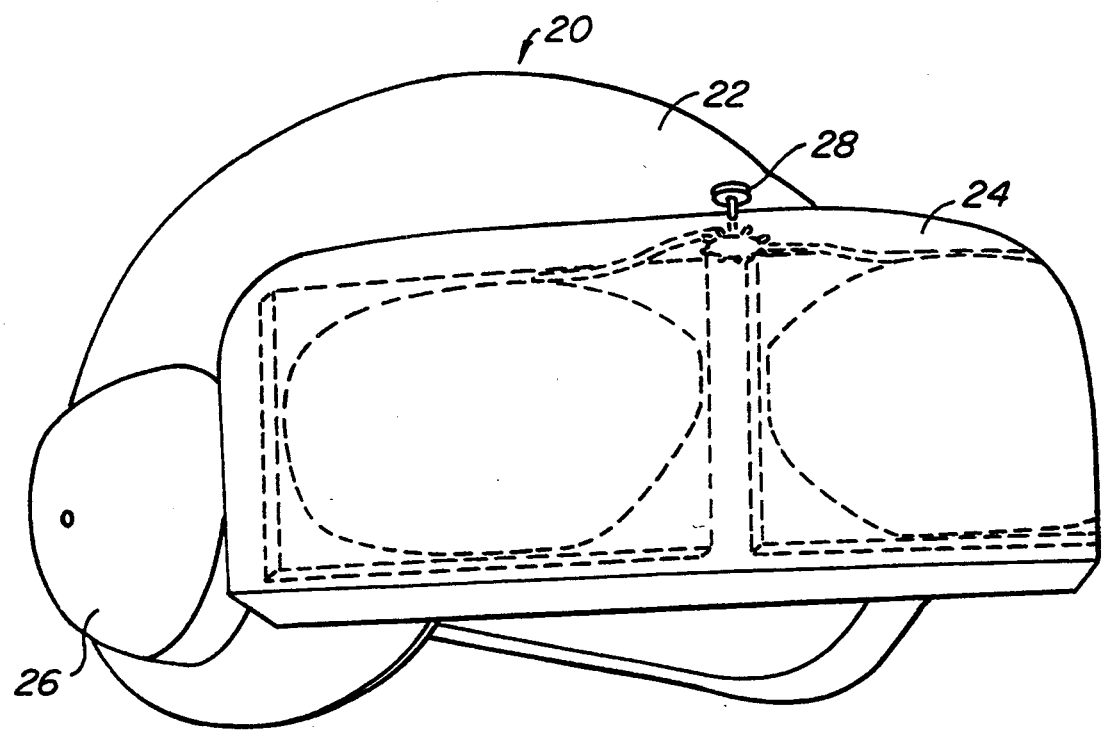
FIG. 1 is a front perspective view of a virtual reality head mounted display constructed in accordance with the principles of the present invention.

A virtual reality head mounted display (HMD) constructed in accordance with the principles of the present invention is illustrated in FIG. 1. Virtual reality HMD 20 comprises a shell or frame 22 designed to be worn on a person's head. Typically, shell or frame 22 will have an interior suspension (not shown) which adapts the HMD to fit snugly on a person's head with little or no movement between frame 22 and the person's head. A display housing 24 is coupled to frame 22 by a hub 26. Preferably, display housing 24 will be rotatably coupled to hub 26 to permit the display housing to be moved upward away from the user's eyes. When in operation, however, housing 24 will be disposed in the position shown in FIG. 1, directly in front of the user's eyes such that the lenses and electronic displays contained in the housing, shown in phantom, are in direct alignment with each of the user's eyes. A thumb wheel 28 extends from the top of display housing 24 for adjusting the interoptic distance between lenses, as described more fully below.

Figure 2:
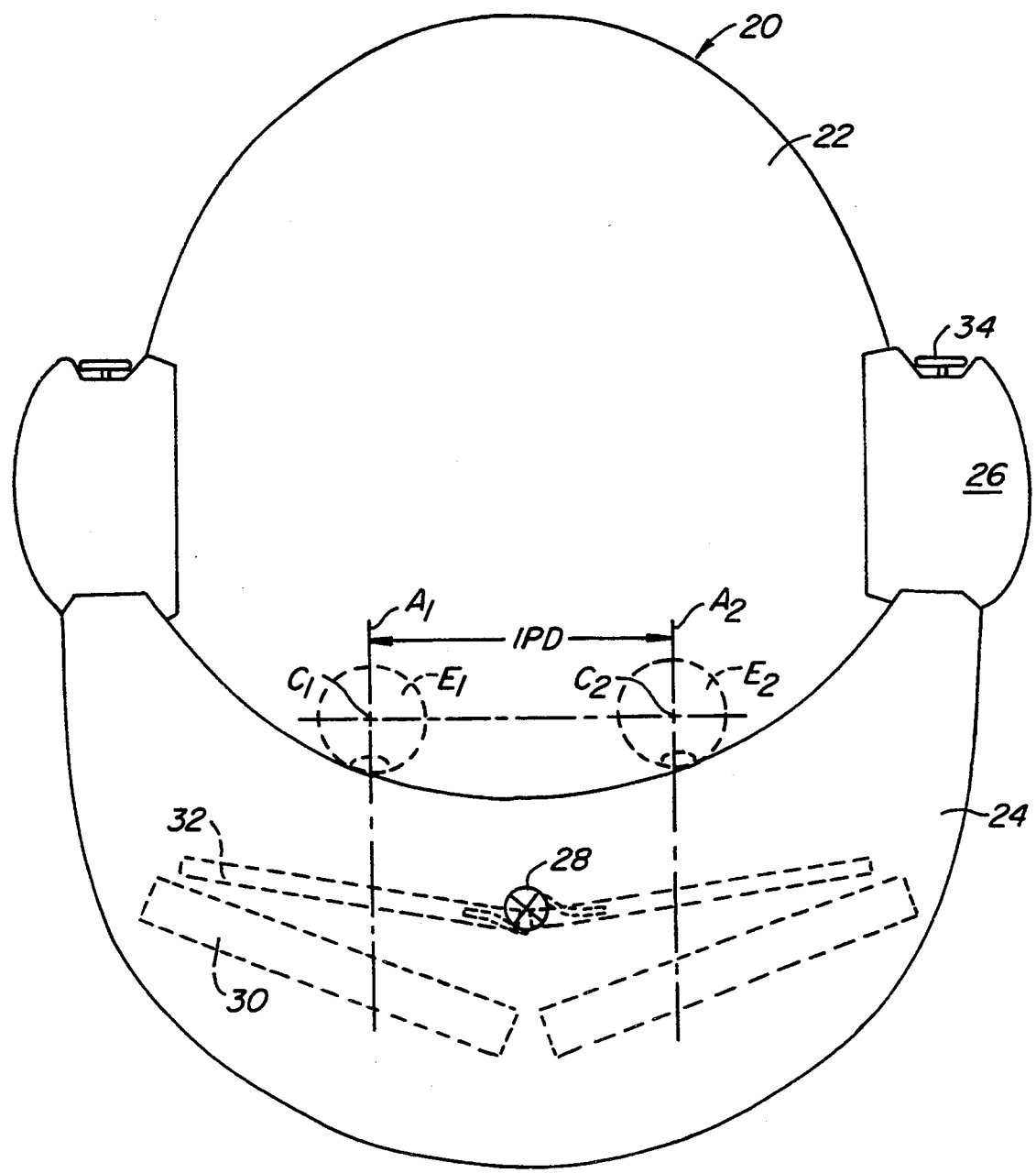
FIG. 2 is a top view of the virtual reality HMD of FIG. 1.

FIG. 2 illustrates a top view of virtual reality HMD 20. A pair of displays 30, shown in phantom, are mounted in display housing 24 so as to be in alignment with optical axes $A_1$, $A_2$ through each of the user's eyes E1, E2. A pair of lenses 32 are disposed between each eye E1, E2 and each display 30. Thumb wheel 28 facilitates adjustment of the interoptic distance between each of lenses 32, to match the interpupillary distance (IPD) between centers $C_1$, $C_2$ of each user's eyes. Release buttons 34 are provided on the rear side of hubs 26 to facilitate adjustment of the roll and height of housing 24 relative to the user's eyes as described more fully below.

Figure 3:
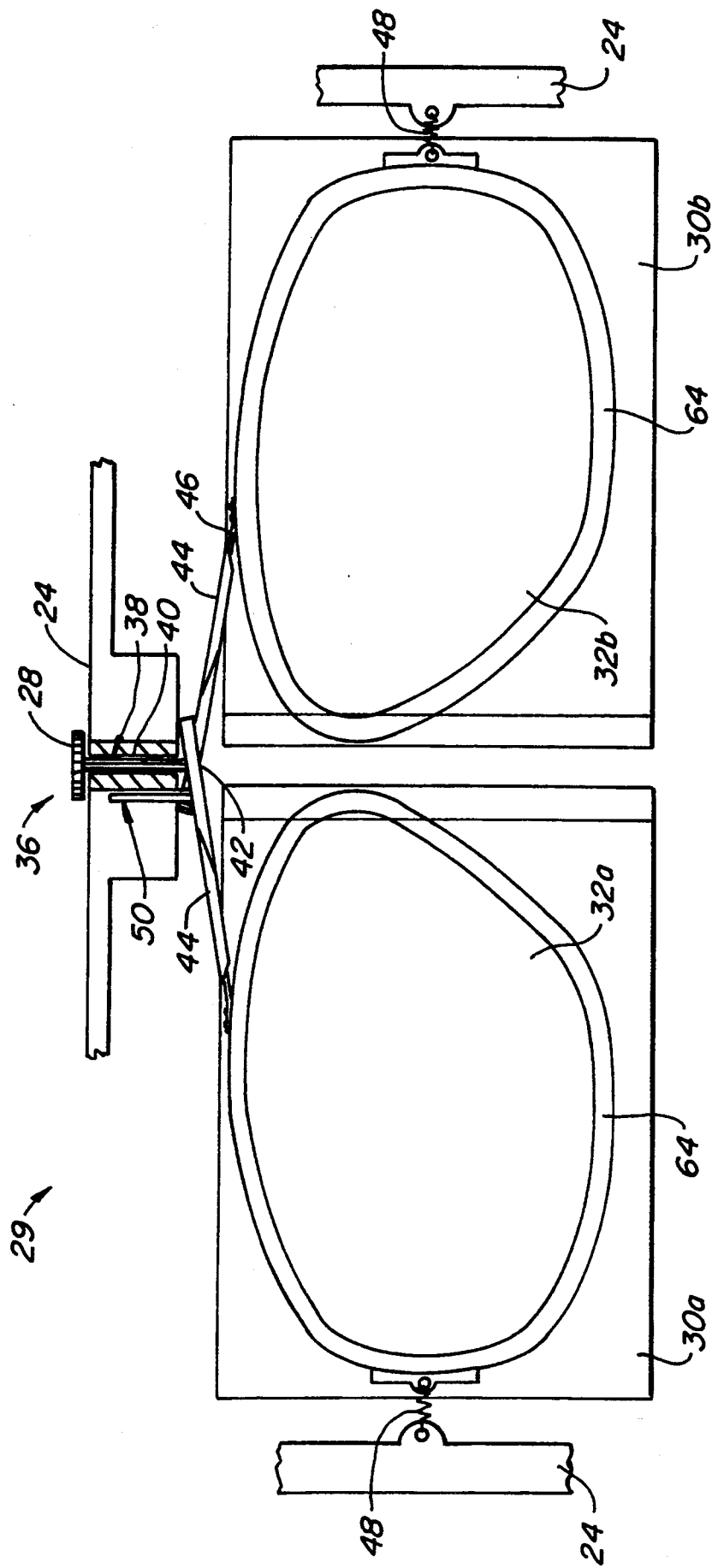
FIG. 3 is a front view of a preferred embodiment of the optical system of the present invention in the virtual reality HMD of FIG. 1.

Referring now to FIG. 3, the optical system of the present invention will be described. Optical system 29 includes a pair of electronic displays 30a, 30b, which in a preferred embodiment will comprise liquid crystal displays (LCDs). Displays 30 may alternatively comprise video, cathode ray tube (CRT), light emitting diode (LED) or other type of display. Displays 30a, 30b are mounted to housing 24 to be in alignment with optical axes A1, A2, as shown in FIG. 2. In front of displays 30a, 30b, lenses 32a, 32b are mounted such that light from displays 30a, 30b passes through lenses 32 to the user's eyes. Lenses 32 will preferably comprise uniquely constructed multi-layer Fresnel lenses, as described more fully below. Lenses 32 provide wide field of view and short focal length such that displays 30a, 30b may be mounted relatively close to the user's eyes, typically within 3 inches, while maximizing the width of the display on which the user can focus at this short range.

Of particular interest to the present invention is the means 36 for mounting lenses 32 within display housing 24. In a preferred embodiment, mounting means 36 comprises a rotatable shaft 38 disposed in a vertical bore 40 in housing 24. Thumb wheel 28 is mounted to the upper end of shaft 38. A pinion gear 42 (shown more clearly in FIGS. 4A-4B) is mounted to the lower end of shaft 38 in housing 24. A pair of guide tubes 44 are mounted to housing 24 and extend from a tangential position near pinion gear 42 laterally outward toward the upper edges of lenses 32a, 32b. Drive strips 46 are mounted at a first end to the upper edge of each lens 32, and extend slidably through guide tubes 44, which guide the opposing ends of the drive strips in a curved, tangential configuration about pinion gear 42. As will be described more fully below, drive strips 46 are engaged by pinion gear 42 so as to be translated through the guide tubes 44 by turning thumb wheel 38. Springs 48 are mounted in tension between housing 24 and the outer edge of each lens 32 so as to urge lenses 32 outward thereby stabilizing and facilitating smooth adjustment of the lenses. A detent rod 50 is mounted to housing 24 and engages pinion gear 42 at its lower end to produce ratcheted actuation of the mechanism.

Referring now to FIGS. 4A and 4B, it may be seen that guide tubes 44 are curved tangentially around pinion gear 42, guiding drive strips 46 in a corresponding configuration. As illustrated in FIGS. 4C and 4D, the end of guide tube 44 is cut at an angle so as to expose a portion of the end of drive strip 46 in an opening 52 on the guide tube. As an alternative to the angled cut at the end of guide tubes 44, a slot may be formed in the wall of the guide tubes to expose a portion of drive strips 46 to permit engagement by pinion gear 42. Drive strips 46 have a plurality of linearly-arranged holes 54 which are engaged by teeth 56 on pinion gear 42. In a preferred embodiment, holes 54 in drive strips 46 will be circular, and teeth 56 on pinion gear 42 will be cylindrical with conical tips. Alternatively, drive strips 46 may have indentations, apertures, or other structures having various shapes, while teeth 56 on the pinion gear may be rectangular, triangular or other complementary configuration. Detent shaft 50 has a depression 58 configured to receive the tips of teeth 56 as pinion gear 42 is rotated.

It may be seen that rotation of pinion gear 42 causes teeth 56 to engage holes 54 in the drive strips, translating the drive strips within guide tubes 44. Depending on the direction of rotation, lenses 32 are drawn toward one another or moved away from one another. In this way, the interoptic distance between lenses 32a, 32b can be adjusted according to the interpupillary distance IPD between the user's eyes E1, E2.

As illustrated in FIG. 4A, displays 30a, 30b are mounted in housing 24 outside of the reference plane RP, which is disposed perpendicular to optical axes A1, A2 through the centers C1, C2 of the user's eyes. If a line L is drawn through centers C1, C2 of the eyes, displays, 30a, 30b will be disposed at an angle a of between 2° and 30°, more typically between 5° and 25°, and preferably about 20°, relatively to line L. Lenses 32a, 32b will be disposed at an angle 0 relative to the visual planes defined by displays 30a, 30b, which will be between 1° and 20°, more typically between 5° and 15°, and preferably about 10°. Thus, angle B between lenses 32 and line L through the centers of eyes E1, E2 will preferably be between 1° and 20°, more typically between 5° and 15°, and preferably about 10°. By tilting the displays out of the reference plane, and tilting the lenses out of the visual planes defined by the displays, a significantly wider field of view is obtained.

When looking through lenses, perceived distortion increases toward the outer extents of the field of view. Tilting the lenses outward relative to the optic plane alters the perceived rate of distortion increase to acceptable levels, which in turn allows the field of view to be widened by a concurrent amount. The best field of view currently available in known head mounted displays is a little over 100° degrees. The limit available to most people is 150°-160° degrees. By tilting the lenses out approximately 10° degrees, and the displays about 20° degrees, I have demonstrated in a field of view in excess of 140° degrees limited by acceptable levels of perceived distortion.

Lenses 32a, 32b in the optical system of the present invention are of unique construction providing significant improvements in image quality. In a preferred embodiment, as shown in FIG. 4B, lenses 32a, 32b comprise an outer lens 60 and an inner lens 62 which have different optical properties from one another. In an exemplary embodiment, one of the lenses will comprise a standard Fresnel lens, while the other of the two lenses will comprise a low diffraction Fresnel lens. Such lenses are commercially available from, for example, Fresnel Technologies of Fort Worth, Texas, under model nos. 4, and 4 low diffraction. Preferably, the inner lens 62 will comprise the low diffraction Fresnel lens, while outer lens 60 will be a standard Fresnel lens.

Figure 5A:
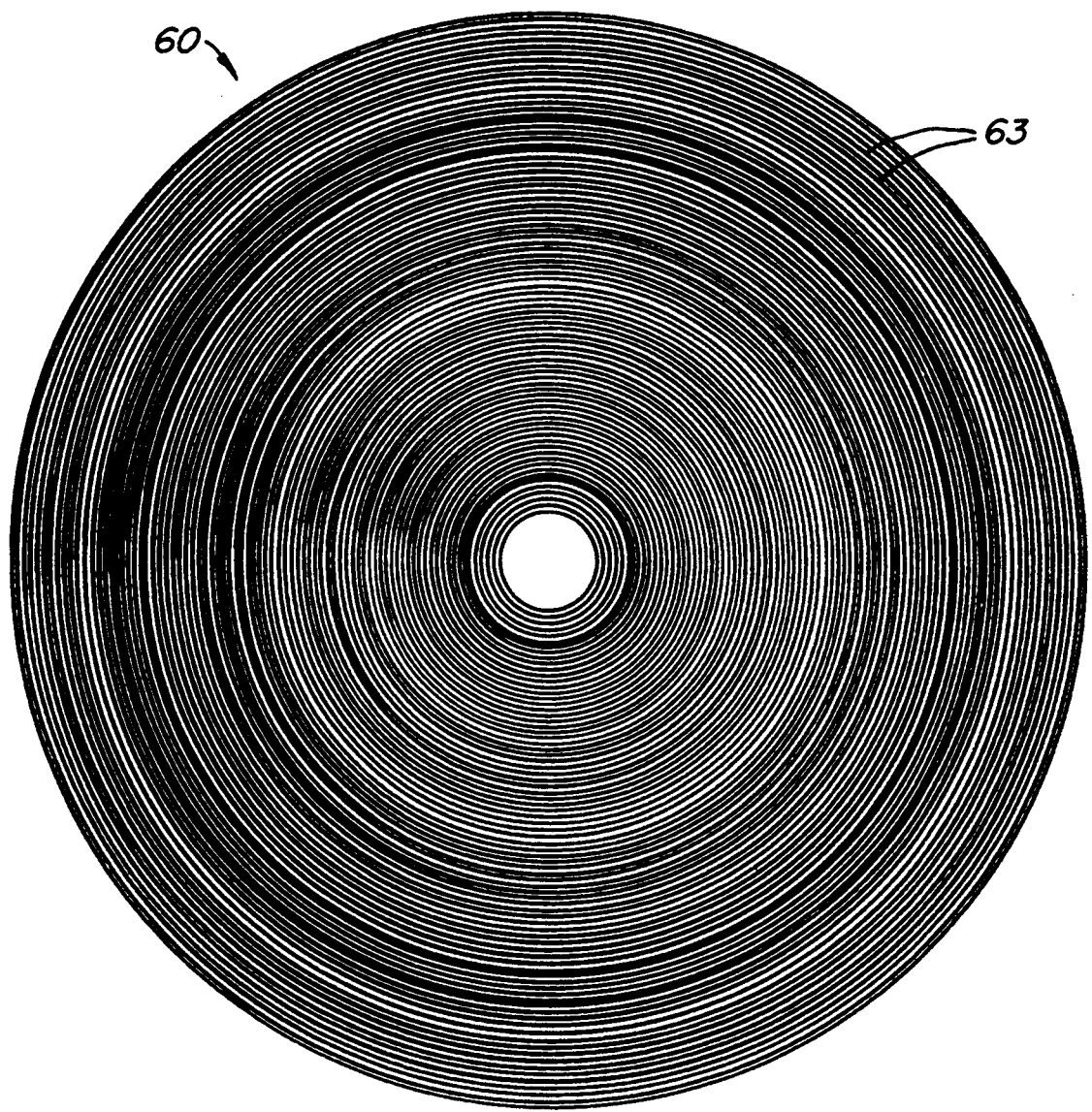
FIGS. 5A-5B are front elevational views of the lens patterns of a standard Fresnel lens and low diffraction Fresnel lens, respectively.

FIG. 5A illustrates a standard Fresnel lens pattern as may be used in outer lens (30. Standard Fresnels have ridges or steps 63 as described above which define the lens curvature spaced at equal distances, in other words, steps of equal size (but different curvature angle $\theta$). When two identical Fresnels are stacked in a condenser pair, the wave fronts are slightly distorted by each lens. In this configuration the 'steps" result in light passing through the thicker cross sections more slowly than through the thinner areas (because light moves slower in solid space than in air). These wave front distortions, which are identical because the lens ridges of each are identical, each add and a subtract from the relative power of the other, resulting in a pattern of strengthened and weakened power from point to point. This is known as moiré interference, and is perceived as a series of light and dark rings, greatly accentuated if the lens axes are de centered from each other. This principle can be demonstrated by moving two pieces of window screen past each other.

Figure 5B:
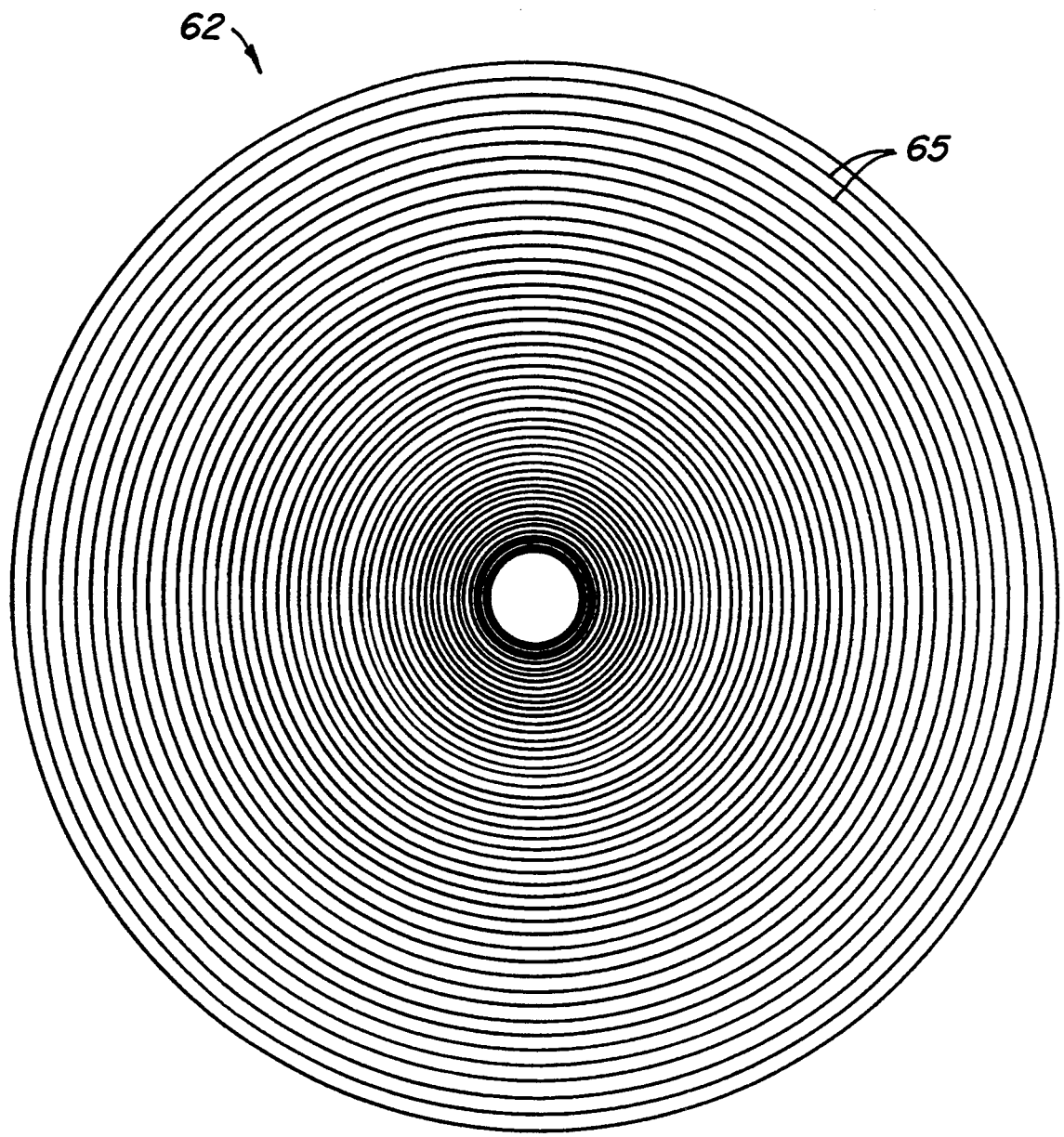

FIG. 5B illustrates a low diffraction Fresnel lens pattern as may be used in inner lens 62. Low diffraction Fresnels have the lens steps 65 arranged in a sine format, smallest in the middle, and steadily increasing in spacing toward the edges of the lens. Angle $\theta$ is the same at all radii, meaning that the lenses, which have the same focal lengths, cannot interfere with each other, (except at the very few points where the wave fronts of the periodic lens and that of the sine lens happen to line up).

The lenses will be mounted to one another by means of a spacer 64, best seen in FIG. 3, which may be any of a variety of materials suitable for bonding to the lenses, using adhesives such as acrylic cement. In this manner, outer lens 60 is mounted in parallel with inner lens 62 with a small spacing therebetween, typically 0.2 to 0.4 inches. Through the use of a low diffraction Fresnel lens and a standard Fresnel lens as the inner and outer lenses of the optical system, the Moiré interference produced by previous lens systems is greatly reduced, resulting in significantly improved image quality.

Figure 6:
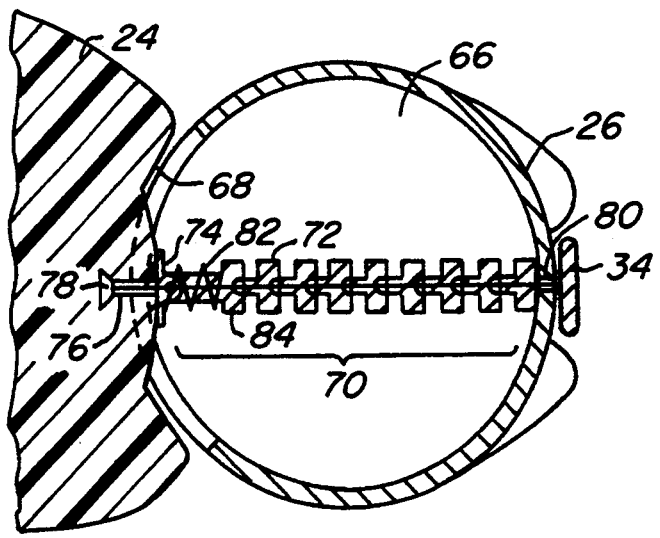
FIG. 6 is a side cross-sectional view of the roll and height adjustment mechanism of an optical system constructed in accordance with the principles of the present invention in the virtual reality HMD of FIG. 1.

Referring now to FIG. 6, the means for connecting the display housing 24 to hub 26 will be described. Hub 26 is mounted to frame 22 of the virtual reality HMD. Housing 24 has a rounded end portion 68 configured to contact the exterior hub 26. A spine 70 comprising a plurality of interconnecting segments 72 is fixed by means of base segment 74 to housing 24. Each of segments 72 as well as base segment 74 has an axial bore through which a cable 76 extends. Cable 76 is fixed to housing 24 by means of an anchor 78, and extends through the axial passage of spine 70 and through an opening 80 in hub 26, connecting to release button 34 external to the hub. A spring 82 is disposed about end segment 84 of the spine and applies axial tension to cable 76, thereby drawing housing 24 against hub 26 and compressing segments 72 together.

Figure 8:
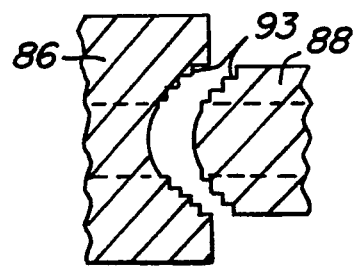
FIG. 8 is a close-up side cross-sectional view of the interconnecting segments of FIGS. 7A-7C.
Figure 7A:
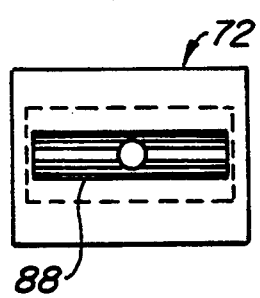
FIGS. 7A-7C are front, side and rear views, respectively of the interconnecting segments in the roll and height adjustment mechanism of FIG. 6.
Figure 7B:
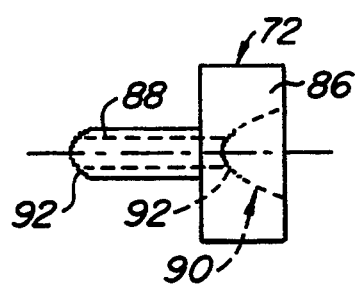
Figure 7C:
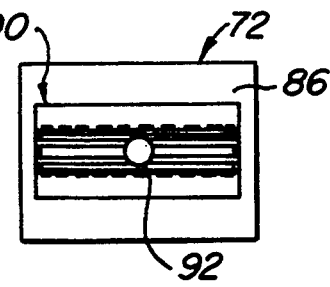

Referring to FIGS. 7A-7C, interconnecting segments 72 comprise a block portion 86 and an extension portion 88. Extension 88 has a rounded end, which is received in an aperture 90 in the block portion of the adjacent segment, permitting each segment to rotate about an axis parallel to a line including centers of both of the user's eyes. An axial bore 92 extends through each segment to permit passage of cable 76. The rounded end of extension 88 includes means 93 for interlocking adjacent segments, which, in an exemplary embodiment, will comprise a plurality of ridges or steps, as shown in FIG. 8. The interior of aperture 90 will have a corresponding plurality of steps, ridges or grooves which mesh with those of extension 88. In this way, the adjacent segments will interlock when tension is exerted on cable 76 to draw the segments toward one another.

Figure 9B:
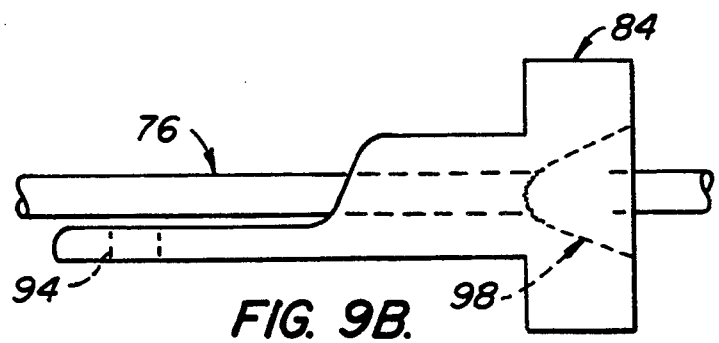
FIGS. 9A-9B are side views of the base and end segment, respectively in the roll and height adjustment mechanism of FIG. 6.
Figure 9A:
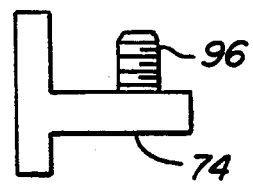

Referring to FIGS. 9A and 9B, end segment 84 has a transverse bore 94 which pivots about a cylindrical shaft 96 on base segments 74. End segment 84 also includes an aperture 98 configured like aperture 90 of each segment 72 to receive extension portion 88 of the adjacent segment.

Referring again to FIG. 6, the tension on cable 76 may be released by depressing release button 34, decorepressing the series of segments 72. Housing 24 may then be rotated about the periphery of hub 26 to a desired roll position. At the same time, it may be desirable to adjust the vertical height of housing 24 (including displays 30 and lenses 32) relative to the user's eyes. Flexible spine 70 facilitates such adjustment of height. Each of segments 70 is pivotable with respect to the adjacent segment about an axis parallel to line L (FIG. 4A) through centers of the user's eyes. Thus, while housing 24 is rotated about hub 26 to adjust the roll of the display and lenses, segments 72 of spine 70 may be pivoted relative to one another to adjust the height of housing 24 relative to the user's eyes. When the desired position has been obtained, release button 34 is released, tensioning cable 76 so as to draw segments 72 into engagement with one another. Interlocking means 93 on each segment locks housing 24 in position relative to frame 22 of the HMD.

While the above is a complete description of the preferred embodiments of invention, various alternatives, modifications, and equivalents may be used. Therefore, the above description should not be taken as limiting the scope of the invention which is defined by the appended claims.

What is claimed is:

1. An optical system for a virtual reality head mounted display (HMD) having a frame for mounting on a person's head, the optical system comprising:
   a housing coupled to the frame;
   a pair of displays attached to the housing, each display defining a visual plane;
   a first lens disposed between a first of the displays and a first of the person's eyes;
   a second lens disposed between a second of the displays and a second of the person's eyes; and
   means for mounting the first and second lenses to the housing such that each lens is disposed at a first angle in a range of 1°–15° relative to the visual plane, the mounting means including means for adjusting the distance between the first and second lenses.

2. The optical system of claim 1 wherein the first and second lenses are mounted so as to be disposed at a second angle in a range of 1°–15° relative to a line including centers of both of the person's eyes, an outer edge of each lens being closer to said line than an inner edge of each lens.

3. The optical system of claim 2 wherein said first and second angles are about 10°.

4. The optical system of claim 1 wherein each visual plane is disposed at a third angle in a range of 2°–30° relative to a line including centers of both of the person's eyes.

5. The optical system of claim 4 wherein the third angle is about 20°.

6. The optical system of claim 1 wherein the mounting means comprises:
   a shaft rotatably mounted to the housing;
   a first linkage having a first end attached to the first lens and a second end for engaging the shaft;
   a second linkage having a first end attached to the second lens and a second end for engaging the shaft; and
   means for coupling the second ends of the linkages to the shaft, whereby rotating the shaft translates the first and second linkages relative to the shaft to adjust the distance between the lenses.

7. The optical system of claim 6 wherein the coupling means comprises a pinion fixed to the shaft, said first and second linkages each comprising an elongate drive strip configured to engage the pinion.

8. The optical system of claim 7 wherein the pinion has a plurality of teeth, the drive strips having a plurality of holes engaged by said teeth.

9. The optical system of claim 8 wherein the holes are round and the teeth are cylindrical with conical tips.

10. The optical system of claim 7 wherein each linkage further includes a guide tube attached to the housing, the drive strips being slidably disposed within the guide tubes.

11. The optical system of claim 6 wherein the mounting means further includes means for rotating the shaft.

12. The optical system of claim 11 wherein the means for rotating comprises a thumb wheel fixed to the shaft.

13. The optical system of claim 1 wherein each of the first and second lenses comprises an inner lens and an outer lens separated by a spacer, the inner lens having different optical properties than the outer lens.

14. The optical system of claim 13 wherein one of the lenses is a Fresnel lens and the other of the lenses is a low diffraction Fresnel lens.

15. The optical system of claim 14 wherein the inner lens is the low diffraction Fresnel lens.

16. The optical system of claim 1 further comprising means for adjusting roll of the housing about a first axis parallel to a line including centers of both of the person's eyes.

17. The optical system of claim 16 wherein the roll adjusting means comprises a hub fixed to the frame of the HMD and means for rotatably coupling the housing to the hub.

18. The optical system of claim 17 wherein the means for rotatably coupling the housing to the hub is configured to allow adjustment of the lenses about a second axis parallel to the first axis.

19. The optical system of claim 18 further comprising means for selectively releasing tension on the cable.

20. The optical system of claim 18 wherein the means for rotatably coupling the housing to the hub comprises:
   a flexible spine disposed within the hub and having an axial passage therethrough;
   a cable extending through the hub and the axial passage of the spine, the cable having a first end connected to the housing and a second end connected to the hub; and
   means for exerting tension on the cable.

21. The optical system of claim 20 wherein the spine comprises a plurality of interconnected segments, the segments being pivotal with respect to one another about only one axis parallel to said first axis, each of said segments having an axial bore for receiving the cable.

22. The optical system of claim 21 further comprising means for interlocking the segments of the spine to maintain the housing in a position about said first and second axes.

23. The optical system of claim 22 wherein the segments of the spine interconnect along mating surfaces, the interlocking means comprising a plurality of transverse steps along the mating surfaces of each segment, wherein the steps on one segment mesh with the steps on an adjacent segment when the cable is tensioned.

24. An optical system for a virtual reality head mounted display (HMD) worn on a person's head, the HMD having a frame fixed with respect to said person's head, the optical system comprising:
   a housing coupled to the frame of the HMD;
   a pair of displays attached the housing in alignment with the person's eyes, the displays each defining a visual plane;
   a first lens disposed between a first of the displays and a first of the person's eyes;
   a second lens disposed between a second of the displays and a second of the person's eyes; and
   means for mounting the first and second lenses to the housing such that the each lens is disposed at a first angle in the range of 1°–15° relative to the visual plane;
   wherein each of the first and second lenses comprises an inner lens and an outer lens separated by a spacer, the inner lens having different optical properties than the outer lens.

25. The optical system of claim 24 wherein one of the lenses comprises a Fresnel lens and the other of the lenses comprises a low-diffraction Fresnel lens.

26. The optical system of claim 25 wherein the inner lens comprises the low diffraction Fresnel lens.

27. The optical system of claim 24 wherein the mounting means further includes means for adjusting the distance between the first and second lenses.

28. The optical system of claim 24 wherein each of the visual planes is mounted so as to be disposed at a second angle in the range of 2°–30° relative to a line including centers of both of the person's eyes, an outer edge of each lens being closer to said line than an inner edge of each lens.

29. The optical system of claim 28 wherein the first angle is about 10° and the second angle is about 20°.

* * * * *

UNITED STATES PATENT AND TRADEMARK OFFICE
CERTIFICATE OF CORRECTION

PATENT NO. : 5,347,400
DATED : September 13, 1994
INVENTOR(S) : Ken Hunter

It is certified that error appears in the above-indentified patent and that said Letters Patent is hereby corrected as shown below:

Column 2, line 41, delete "tings" and insert --rings--.
line 42, delete "de centered" and insert --de-centered--.
Column 3, line 24, before "displays" insert --LCD--.
line 25, before "the housing" insert --to--.
Column 4, line 34, delete "Moire" and insert --Moiré--.
line 36, delete "fight" and insert --right--.
line 44, delete "Moire" and insert --Moiré--.
Column 6, line 18, delete "38" and insert --28--.
line 31, delete "As an alternative" insert --In addition--.
line 53, delete "IPD" and insert --(IPD)--.
line 55, delete "outside" and insert --inside--.
line 59, delete "angle a" and insert --angle $\alpha$--.
line 62, delete "angle 0" and insert --angle $\theta$--.
line 65, delete "angle B" and insert --angle $\beta$--.

UNITED STATES PATENT AND TRADEMARK OFFICE
CERTIFICATE OF CORRECTION

PATENT NO. : 5,347,400

DATED : September 13, 1994

INVENTOR(S) : Ken Hunter

It is certified that error appears in the above-indentified patent and that said Letters Patent is hereby corrected as shown below:

Column 7, line 14, after "demonstrated" delete "in".
         line 32, delete "(30" and insert --60--.
         line 38, delete "'steps'" and insert --"steps"--.
         line 43, before "subtract" delete "a".
         line 46, delete "moiré" and insert --Moiré--.
         line 48, delete "de centered" and insert --de-centered--.
Column 8, line 44, delete "decorepressing" and insert --decompressing--.

Signed and Sealed this

Fourteenth Day of March, 1995

Attest:

BRUCE LEHMAN

Attesting Officer

Commissioner of Patents and Trademarks